US012748395B2

(12) United States Patent
Hamaguchi et al.

(10) Patent No.: US 12,748,395 B2
(45) Date of Patent: Sep. 29, 2026

(54) OPERATION PLAN CREATION DEVICE, OPERATION PLAN CREATION METHOD, AND OPERATION PLAN CREATION PROGRAM

(71) Applicant: IHI CORPORATION, Tokyo (JP)

(72) Inventors: Kenichi Hamaguchi, Tokyo (JP); Akinobu Inamura, Tokyo (JP); Yuji Koguma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 859 days.

(21) Appl. No.: 18/075,498

(22) Filed: Dec. 6, 2022

(65) Prior Publication Data

US 2023/0185258 A1 Jun. 15, 2023

(30) Foreign Application Priority Data

Dec. 9, 2021 (JP) ................................ 2021-199796

(51) Int. Cl.
*G05B 13/04* (2006.01)
*H02J 3/00* (2026.01)
*H02J 3/38* (2026.01)

(52) U.S. Cl.
CPC ............ *G05B 13/048* (2013.01); *H02J 3/004* (2020.01); *H02J 3/381* (2013.01)

(58) Field of Classification Search
CPC ........ G05B 13/048; H02J 3/004; H02J 3/381; H02J 2203/20; H02J 2300/10;
(Continued)

(56) References Cited

U.S. PATENT DOCUMENTS

2012/0083927 A1* 4/2012 Nakamura ............... F24F 11/30 700/278
2012/0235478 A1* 9/2012 Hayashida ............. F24D 17/02 307/11

(Continued)

FOREIGN PATENT DOCUMENTS

CN 108599158 A 9/2018
CN 111463772 A 7/2020

(Continued)

OTHER PUBLICATIONS

Naoki Toda et al., "Carbon neutral implementation strategy: Electrification and hydrogen and ammonia", Energy Forum, pp. 95-96, Mar. 12, 2021.

*Primary Examiner* — Ziaul Karim

(57) ABSTRACT

Provided is an operation plan creation device that creates an operation plan for a load device in a microgrid including a renewable energy generation device and the load device. The operation plan includes a plan for performing a start operation or a stop operation of the load device. The operation plan creation device includes a creation unit that creates the operation plan on the basis of information related to a prediction value of power generated in the renewable energy generation device for an entire creation period of the operation plan, information related to power consumption characteristics of the load device, and information related to temporary power consumption necessary for the start operation or the stop operation of the load device included in the operation plan.

9 Claims, 8 Drawing Sheets

(58) Field of Classification Search
CPC .......... H02J 2300/24; H02J 3/00; H02J 3/003; H02J 3/14; H02J 3/32; H02J 3/38; H02J 3/46; H02J 3/466; H02J 13/00
See application file for complete search history.

(56) References Cited

U.S. PATENT DOCUMENTS

| | | | | |
|---|---|---|---|---|
| 2015/0063473 | A1* | 3/2015 | Nishibayashi | H02J 13/00 375/257 |
| 2017/0279277 | A1* | 9/2017 | Ruez | G05B 13/0255 |
| 2018/0283799 | A1* | 10/2018 | Sakai | F24F 11/30 |
| 2019/0341781 | A1 | 11/2019 | Marchegiani et al. | |
| 2020/0358290 | A1* | 11/2020 | Koguma | G06Q 50/06 |
| 2021/0381120 | A1 | 12/2021 | Akiba et al. | |
| 2022/0121235 | A1 | 4/2022 | Ise et al. | |
| 2023/0170700 | A1* | 6/2023 | Hamaguchi | H02J 3/32 700/291 |

FOREIGN PATENT DOCUMENTS

| | | | |
|---|---|---|---|
| JP | 2018-085862 | A | 5/2018 |
| JP | 2019-029050 | A | 2/2019 |
| JP | 2019-097267 | A | 6/2019 |
| JP | 2020-503831 | A | 1/2020 |
| JP | 2020-173972 | A | 10/2020 |
| JP | 2020-198729 | A | 12/2020 |
| JP | 2021-118574 | A | 8/2021 |
| WO | 2019/189501 | A1 | 10/2019 |
| WO | 2020/121447 | A1 | 6/2020 |
| WO | 2020/153443 | A1 | 7/2020 |

* cited by examiner

OPERATION PLAN CREATION DEVICE, OPERATION PLAN CREATION METHOD, AND OPERATION PLAN CREATION PROGRAM

CROSS-REFERENCE TO RELATED APPLICATIONS

This application claims the benefit of foreign priority to Japanese Patent Application No. JP2021-199796, filed Dec. 9, 2021, which is incorporated by reference in its entirety.

TECHNICAL FIELD

The present disclosure relates to an operation plan creation device, an operation plan creation method, and an operation plan creation program.

BACKGROUND

In recent years, with the spread of renewable energy, concern about influence on power networks has become a social issue. Renewable energy is also called variable renewable energy. It is known that, in a case in which the renewable energy is directly connected to a power system, it adversely affects the voltage or frequency of the power system, depending on the scale. As a countermeasure to this situation, attention is being paid to a technique (P2G: Power to Gas) that produces hydrogen using surplus power from renewable energy. This is an effort to convert power obtained from renewable energy into hydrogen, which is gaseous energy that is excellent in storage, and to convert gas (for example, city gas), which is mainly made from fossil fuels, into hydrogen.

There are the following Patent Literatures 1 to 4 as documents describing techniques for operating a water electrolysis device using renewable energy. For example, Patent Literature 1 discloses the following configuration: in a case in which power generated by photovoltaic power generation is more than power consumption of a load, surplus power is stored in a storage battery; and in a case in which the power generated by the photovoltaic power generation is less than the power consumption of the load, the storage battery is discharged to operate the load. In addition, Patent Literature 2 discloses an energy management system that, in a case in which it is determined that power distributed from a photovoltaic power generation system is greater than a certain threshold value, issues a command to use surplus power as consumption power to a water electrolysis device. Patent Literature 3 discloses a system that smooths power generated by photovoltaic power generation using the power consumption of a water electrolysis device and the charge and discharge of a storage battery. Furthermore, Patent Literature 4 discloses a system that controls the charge and discharge of a storage battery on the basis of a result of comparison between power generated by photovoltaic power generation and a rated value of a water electrolysis device to operate the water electrolysis device at the rated value as much as possible.

Patent Literature 1: Japanese Unexamined Patent Publication No. 2020-198729

Patent Literature 2: Japanese Unexamined Patent Publication No. 2021-118574

Patent Literature 3: Japanese Unexamined Patent Publication No. 2018-85862

Patent Literature 4: Japanese Unexamined Patent Publication No. 2019-029050

However, in Patent Literatures 1 to 4, various conditions related to the operation of a hydrogen production device (water electrolysis device), which is a load device, are set, and power consumption characteristics when the load device is operated are not sufficiently considered. Therefore, there is room for improvement as a method for creating an operation plan for the load device.

SUMMARY

The present disclosure has been made in view of the above problem, and an object of the present disclosure is to provide a technique that can flexibly create an operation plan considering the power consumption characteristics of load devices.

According to an aspect of the present disclosure, there is provided an operation plan creation device that creates an operation plan for a load device in a microgrid including a renewable energy generation device and the load device. The operation plan includes a plan for performing a start operation or a stop operation of the load device. The operation plan creation device includes a creation unit that creates the operation plan on the basis of information related to a prediction value of power generated in the renewable energy generation device for an entire creation period of the operation plan, information related to power consumption characteristics of the load device, and information related to temporary power consumption necessary for the start operation or the stop operation of the load device included in the operation plan.

According to another aspect of the present disclosure, there is provided an operation plan creation method that creates an operation plan for a load device in a microgrid including a renewable energy generation device and the load device. The operation plan includes a plan for performing a start operation or a stop operation of the load device. The operation plan creation method includes creating the operation plan on the basis of information related to a prediction value of power generated in the renewable energy generation device for an entire creation period of the operation plan, information related to power consumption characteristics of the load device, and information related to temporary power consumption necessary for the start operation or the stop operation of the load device included in the operation plan.

According to still another aspect of the present disclosure, there is provided an operation plan creation program that causes a computer to create an operation plan for a load device in a microgrid including a renewable energy generation device and the load device. The operation plan includes a plan for performing a start operation or a stop operation of the load device. The operation plan creation program causes the computer to execute creating the operation plan on the basis of information related to a prediction value of power generated in the renewable energy generation device for an entire creation period of the operation plan, information related to power consumption characteristics of the load device, and information related to temporary power consumption necessary for the start operation or the stop operation of the load device included in the operation plan.

According to the operation plan creation device, the operation plan creation method, and the operation plan creation program, the operation plan is created on the basis of the information related to the prediction value of the power generated in the renewable energy generation device for the entire creation period of the operation plan, the information related to the power consumption characteristics of the load device, and the information related to the temporary power consumption necessary for the start operation or the stop operation of the load device. As described above, the use of the information related to the power consumption characteristics of the load device and the information related to the temporary power consumption necessary for the start operation or the stop operation of the load device makes it possible to create the operation plan on the basis of more detailed information related to the power consumption of the load device including the temporary power consumption. Therefore, it is possible to flexibly create the operation plan considering the power consumption characteristics of the load device.

Here, the microgrid may further include an energy storage device, and the creation unit may create the operation plan also on the basis of an amount of energy stored in the energy storage device. This configuration makes it possible to create the operation plan considering the storage of energy in the energy storage device and thus to more flexibly create the operation plan.

The creation unit may create the operation plan on condition that a time period for which the start operation or the stop operation is executable is limited. In some cases, the time period for which the load device can be operated is limited. For example, the start operation and the stop operation of the load device need to be performed by an operator. In this case, the above-described configuration makes it possible to create the operation plan having reduced obstacles to execution.

The creation unit may create the operation plan on condition that upper limits of the start operation and the stop operation of the load device or the numbers of start operations and stop operations are designated. It is considered that an increase in the numbers of start operations and stop operations of the load device is likely to lead an increase in the burden on the operator and to cause deterioration resulting from fluctuations in power consumption caused by the start operation and the stop operation of the load device. In this case, the above-described configuration makes it possible to create the operation plan having reduced obstacles to execution.

The creation unit may create the operation plan on condition that a plan in which a fluctuation in power consumption of the load device is gentle is preferentially adopted. The fluctuations in the power consumption of the load device are likely to affect the deterioration of the load device itself. In contrast, the above-described configuration makes it possible to create the operation plan having reduced obstacles to execution.

The microgrid may be capable of exchanging energy with an outside, and the creation unit may create the operation plan on condition that a plan in which a fluctuation in an amount of energy exchanged with the outside is gentle is preferentially adopted. When the amount of energy exchanged between the microgrid and the outside increases, the increase is likely to threaten the stability of an external power system. In contrast, the above-described configuration makes it possible to create the operation plan in which the amount of energy exchanged with the outside is stable.

The creation unit may set an optimization problem on condition that a total amount of product generated by an operation of the load device or a profit based on the product is maximized and solve the optimization problem to create the operation plan. The above-described configuration makes it possible to create the operation plan on condition that the result based on the operation of the load device is large.

According to the present disclosure, it is possible to provide a technique that can flexibly create an operation plan considering the power consumption characteristics of a load device.

DETAILED DESCRIPTION

Figure 1:
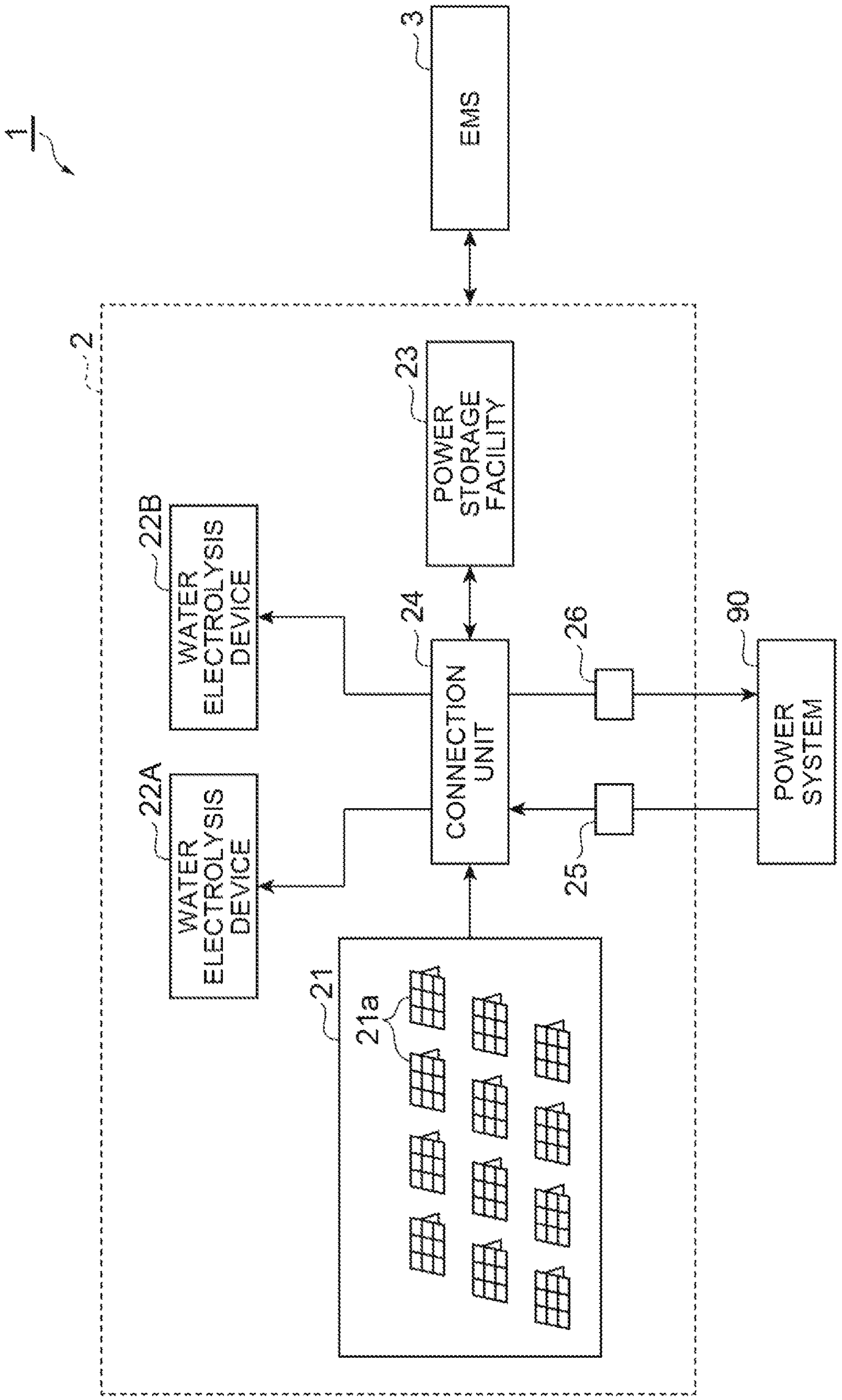
FIG. 1 is a schematic diagram illustrating a power supply system according to an embodiment.

Hereinafter, exemplary embodiments of the present disclosure will be described in detail with reference to the accompanying drawings. In the description of the drawings, the same elements are denoted by the same reference numerals, and the description thereof will not be repeated.

[Power Supply System]

FIG. 1 is a diagram schematically illustrating a configuration of a power supply system 1 according to an embodiment. As illustrated in FIG. 1, the power supply system 1 includes a microgrid 2 and an energy management system 3 (operation plan creation device). Hereinafter, the "energy management system" is referred to as an "EMS". The microgrid 2 is configured to include a photovoltaic power generation facility 21, two water electrolysis devices 22A and 22B, a power storage facility 23, a connection unit 24, a received power measurement unit 25, and a transmission power measurement unit 26. In addition, the microgrid 2 is connected to an external power system 90 and can transmit and receive power to and from the power system 90.

The photovoltaic power generation facility 21 is an example of a renewable energy generation device. The photovoltaic power generation facility 21 is a photovoltaic (PV) power generation system and includes a photovoltaic panel 21*a* and a power conditioning system (PCS) (not illustrated). In some cases, the power conditioning system is called a PV-PCS. The PV-PCS converts a direct current into an alternating current.

In addition, in the present disclosure, the type of the renewable energy generation facility is not limited to photovoltaic power generation. For example, the renewable energy generation facility may be a wind power generation system, a geothermal power generation system, a biomass power generation system, or a waste power generation system. In the case of photovoltaic power generation, the amount of power generated fluctuates under the influence of weather conditions (solar radiation, temperature, and snowfall). Further, in the case of wind power generation, the amount of power generated fluctuates under the influence of a wind speed. In addition, in biomass power generation and waste power generation, the properties of biomass and waste (for example, waste products or sludge), which are raw materials, are generally not stable, and an output is not stable due to, for example, the temporary contamination of substances unsuitable for incineration. Therefore, the above-mentioned power generation method is a method to which the technique described in the present disclosure is effectively applied, similarly to the photovoltaic power generation.

The water electrolysis devices 22A and 22B are examples of a load device.

The water electrolysis device is a system that produces hydrogen using water electrolysis. In general, the water electrolysis devices can be divided into an alkaline electrolysis device, an anion exchange membrane (AEM), a solid oxide electrolysis cell (SOEC (high temperature type)), a proton exchange electrolysis cell (PEEC (high temperature type)), and a proton exchange membrane (PEM) according to a water electrolysis method. Any of the above-described water electrolysis devices may be adopted as the water electrolysis devices 22A and 22B. In addition, the two water electrolysis devices 22A and 22B may be devices using the same water electrolysis method. In addition, devices using different water electrolysis methods may be combined. For example, a configuration in which one PEM and one alkaline water electrolysis device are combined may be used.

In this embodiment, it is assumed that the two water electrolysis devices 22A and 22B can be independently operated. The produced hydrogen is stored in a hydrogen storage system (not illustrated). The stored hydrogen may be filled into a girdle or a hydrogen trailer by a hydrogen compressor and transported to a hydrogen demand area or may be locally supplied to a fuel cell vehicle (FCV) through a dispenser (the latter is called an on-site hydrogen station). In addition, the stored hydrogen may be supplied to another hydrogen demand area through a pipeline. In either example, it is assumed that the hydrogen produced by the water electrolysis devices 22A and 22B is taken out of the microgrid 2 by, for example, appropriate transportation.

Further, the load device in the microgrid 2 is not limited to the above-described system for producing and storing hydrogen and may be other load devices. For example, an electric boiler may be used instead of the water electrolysis devices 22A and 22B, and a steam accumulator may be used instead of the hydrogen storage system. Furthermore, a plurality of load devices may be different types. For example, one of the two load devices may be a water electrolysis device, and the other load device may be an electric boiler. The configuration described in this embodiment can be applied to any power load device that consumes power due to temperature rise, ventilation, or the like during a startup or shutdown operation.

The power storage facility 23 is an example of an energy storage device. The power storage facility 23 is configured to include a storage battery. The storage battery is a secondary battery such as a lithium-ion battery, a lead battery, or a redox flow battery. The storage device may be an energy storage device, such as a flywheel/compressed air energy storage (CAES) facility or a pumped-storage power generation facility, in addition to the secondary battery. In addition, it is assumed that a storage battery PCS that converts a direct current of the storage battery into an alternating current or a device for monitoring a remaining storage battery level is also included in the power storage facility.

The connection unit 24 has a function of distributing power to each unit including the external power system 90. The connection unit 24 is, for example, a distribution board. For example, the connection unit 24 controls the distribution of power to each unit on the basis of an instruction from the EMS 3. The received power measurement unit 25 and the transmission power measurement unit 26 measure the power received from and transmitted to the external power system 90, respectively.

[EMS (Operation Plan Creation Device)]

Figure 2:
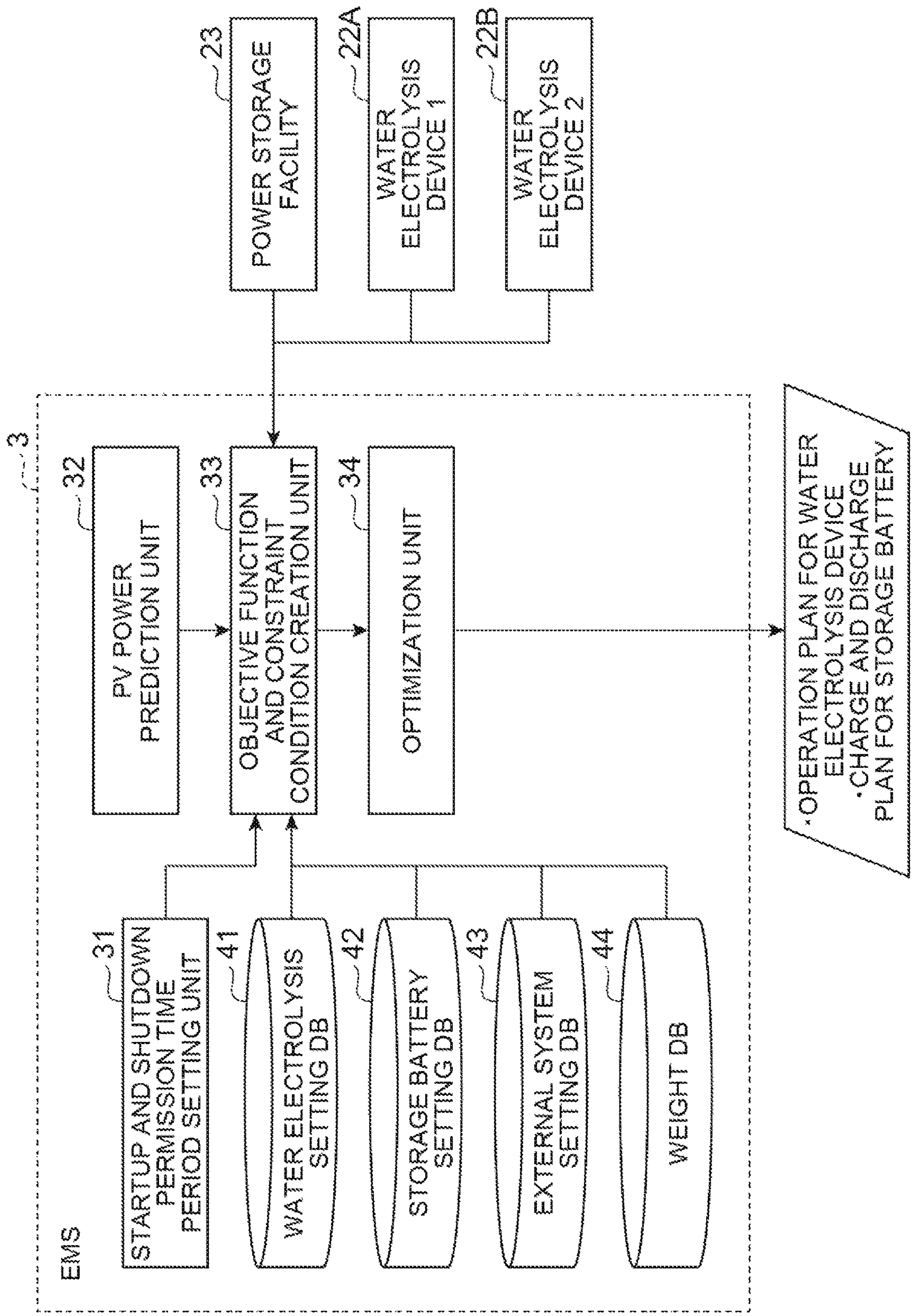
FIG. 2 is a block diagram describing functions of an EMS.

FIG. 2 is a diagram illustrating the EMS 3 that monitors the movement and exchange of power in the microgrid 2. That is, the EMS 3 functions as an operation plan creation device that creates an operation plan. However, in FIG. 2, only functional units related to an operation plan creation function intended by the present disclosure among various functions of the EMS 3 are illustrated. The EMS 3 has, for example, a trend data storage function and a demand monitoring function as functions than the functions illustrated in FIG. 2. However, these functional units are omitted.

As illustrated in FIG. 2, the EMS 3 includes a startup and shutdown permission time period setting unit 31, a PV power prediction unit 32, an objective function and constraint condition creation unit 33, an optimization unit 34, and a water electrolysis setting DB 41, a storage battery setting DB 42, an external system setting DB 43, and a weight DB 44 as databases (DBs).

The startup and shutdown permission time period setting unit 31 has a function of setting time periods (permission time periods) for which the startup (start) and shutdown (stop) operations of the water electrolysis devices 22A and 22B in the microgrid 2 are permitted. Specifically, the user operates a screen of a computer and a keyboard or a mouse to set the time period. The user sets a time period that can correspond to the startup operation of the water electrolysis devices 22A and 22B and a time period that can correspond to the shutdown operation of the water electrolysis devices 22A and 22B. The startup and shutdown permission time period may be set individually for the two water electrolysis devices 22A and 22B. However, in this embodiment, a case in which the startup and shutdown permission time period common to the two water electrolysis devices 22A and 22B is set will be described. For example, the startup and shutdown permission time period may be set as follows: since employees take their lunch break from 12:00 to 13:00, the period from 12:00 to 13:00 is not included in the startup and shutdown permission time period of the devices. In addition, the startup and shutdown permission time period may be set as follows. When there are night shifts and the like, it is not possible for the employees to perform the start and stop operations during the shift of the employees. Therefore, the shift time is not included in the permission time period. As described above, the startup and shutdown permission time period may be set on the basis of, for example, the securing of employees or may be set according to the environment of the water electrolysis devices 22A and 22B or the microgrid 2. The startup and shutdown permission time period can be set in advance by the operator.

The PV power prediction unit 32, the objective function and constraint condition creation unit 33, and the optimization unit 34 are functional units that function during operation planning in the EMS 3 and are functional units that perform calculations related to the optimization of the operation plan. That is, the PV power prediction unit 32, the objective function and constraint condition creation unit 33, and the optimization unit 34 function as a creation unit that creates an operation plan on the basis of information related to a prediction value of the power generated in a renewable energy generation device for the entire plan creation period, information related to the power consumption characteristics of the water electrolysis devices 22A and 22B which are load devices, and information related to temporary power consumption necessary for the start operation or the stop operation of the load devices included in the operation plan.

The PV power prediction unit 32 has a function of preparing the prediction value of the power generated by photovoltaic power generation for a period for which the operation plan is to be made. As a method for predicting the power generated by the photovoltaic power generation by the PV power prediction unit 32, for example, the following methods are used: a method that predicts PV power on the basis of weather forecast data (the amount of solar radiation and temperature); and a method that predicts PV power from the past prediction value of local PV power or the amount of solar radiation using a statistical method. However, any method may be used. In addition, the PV power prediction unit 32 may not calculate the prediction value of the power generated, but the prediction value of the PV power may be obtained from an external prediction device or the like using communication.

The objective function and constraint condition creation unit 33 has a function of creating an objective function and a constraint condition expression for an optimization problem required to create the operation plan. In this case, the objective function and constraint condition creation unit 33 acquires the current states of the power storage facility 23 and the water electrolysis devices 22A and 22B from a communication device or a control device that controls each of the power storage facility 23 and the water electrolysis devices 22A and 22B. Specifically, the objective function and constraint condition creation unit 33 acquires the remaining storage battery level from the power storage facility 23 and acquires the current operating state (information specifying whether the device is being operated or stopped) from the water electrolysis devices 22A and 22B.

In addition, the EMS 3 acquires values necessary for formulating optimization, such as the water electrolysis device, the storage battery, the external system, a unit price, and a weight from the water electrolysis setting DB 41, the storage battery setting DB 42, the external system setting DB 43, and the weight DB 44, respectively. It is assumed that the values stored in each of the DBs 41 to 44 have been set in advance by an operator or a designer of the microgrid 2 and stored in each of the DBs 41 to 44.

The objective function and constraint condition creation unit 33 creates the objective function and the constraint condition expression for the optimization problem using the values stored in the DBs 41 to 44.

The optimization unit 34 solves the objective function and the constraint condition expression for the optimization problem created by the objective function and constraint condition creation unit 33 to create the operation plan. Information included in the operation plan includes an operation plan (a start time, a stop time, and the amount of hydrogen produced) for the water electrolysis devices 22A and 22B and a charge and discharge plan (a charge time and a discharge time) for the power storage facility 23. The optimization problem created by the objective function and constraint condition creation unit 33 is formulated as, for example, a mixed integer linear programming problem, which will be described below. Therefore, the optimization unit 34 can easily find the solution using, for example, a commercially available optimization solver.

Each of the water electrolysis setting DB 41, the storage battery setting DB 42, the external system setting DB 43, and the weight DB 44 has a function of storing parameters necessary for creating the optimization problem. The information stored in each of the DBs 41 to 44 will be described below.

Figure 5:
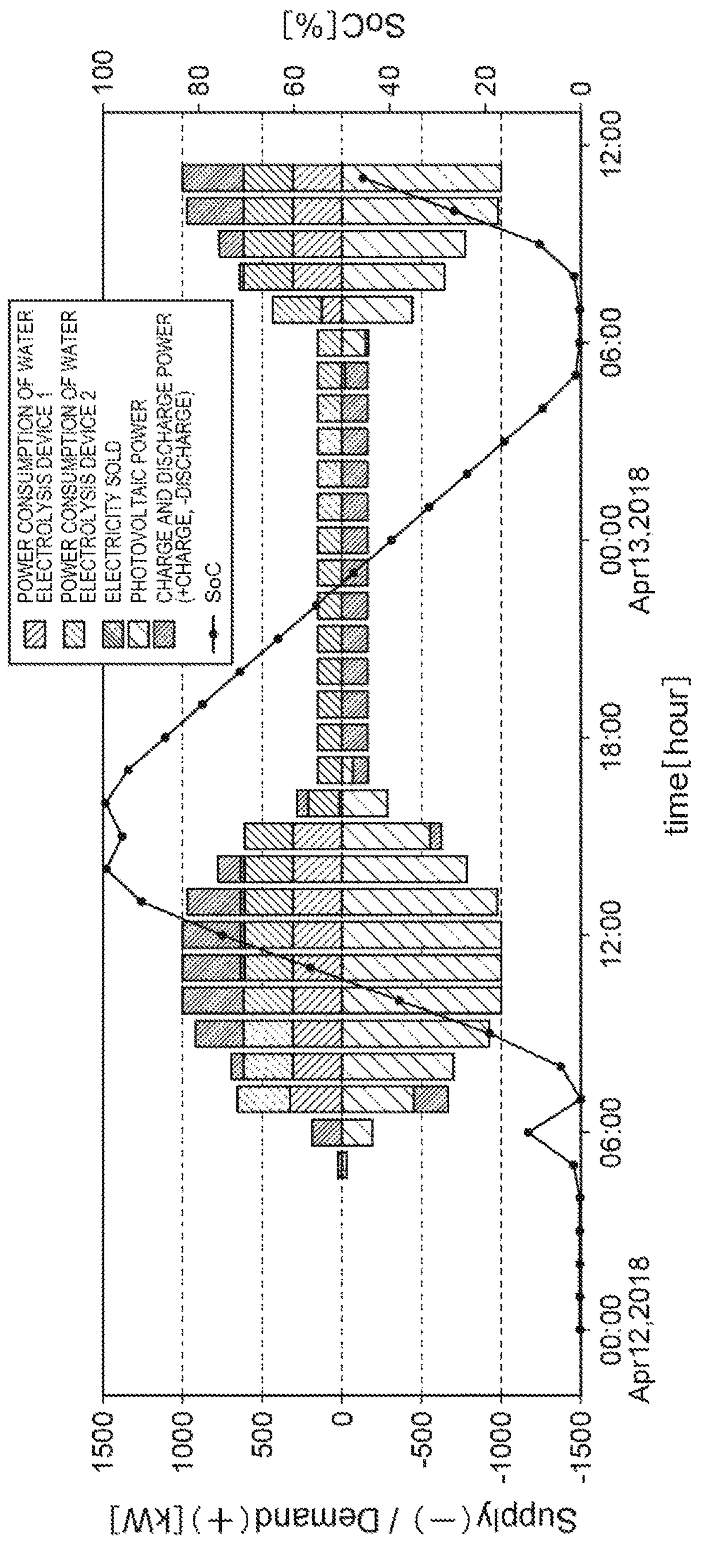
FIG. 5 is a diagram illustrating simulation results in the first example.
Figure 7:
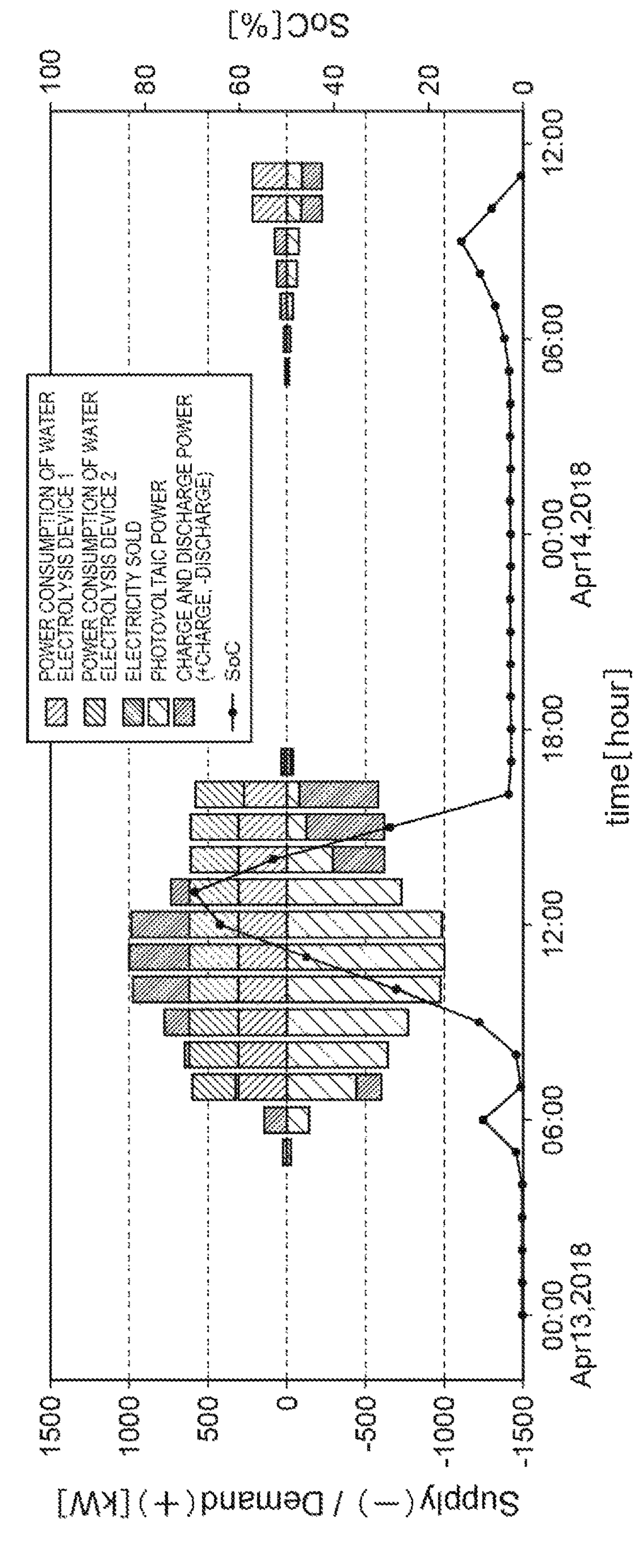
FIG. 7 is a diagram illustrating simulation results in the second example.

After obtaining the solution of the operation plan using the calculation by the optimization unit 34, the EMS 3 may create a graph which visualizes the created operation plan as illustrated in FIG. 5 or FIG. 7 and present the graph to the operator through a display of a personal computer or a smart phone. The operator may see the result presented by the EMS 3 and use the result as a reference for the operation of the microgrid 2. In addition, the operator may partially change the weight or the startup and shutdown permission time period to perform recalculation. Further, a method for presenting the optimization results of the operation plan by the optimization unit 34 is not limited to display by display device. For example, the optimization results may be printed by a printer or may be distributed by e-mail. Furthermore, the optimization results are not necessarily illustrated in a diagram. For example, only the startup time and the shutdown time of the two water electrolysis devices 22A and 22B may be transmitted to the operator by e-mail or the like.

In addition, the EMS 3 may give command values to each device (specifically, the water electrolysis devices 22A and 22B and the power storage device 23) of the microgrid 2 on the basis of the optimization results obtained by the optimization unit 34 to control each device such that each device is operated according to the optimization results. Further, values at all times obtained by the optimization may not be used as the command values given to each device of the microgrid 2. For example, the following operation may be performed: optimization calculation is performed every hour; and a value for the first hour obtained by each optimization calculation is adopted as the command value.

Furthermore, as a method for using the optimization results, the EMS 3 does not need to give command values based on the optimization results to all of the devices included in the optimization results. For example, the EMS 3 may give only the load command values of the water electrolysis devices 22A and 22B. In this case, the power storage facility 23 that has not received the command value may be operated by a different control logic. For example, the power storage facility 23 may be configured to be subjected to charge and discharge control such that the power received from and transmitted to the power system 90 reaches a given target value.

In addition, as described above, in some cases, the startup and shutdown operations need to be manually performed. Therefore, only in a case in which the water electrolysis devices 22A and 22B are being operated, the EMS 3 may automatically transmit the command values to the water electrolysis devices 22A and 22B. That is, the operator or another worker may perform the startup and shutdown operations, and load adjustment during the startup period of the water electrolysis devices 22A and 22B may be automatically performed on the basis of the optimization results by the EMS 3.

Further, commands may be given from the EMS 3 to each device using wired communication, such as Ethernet (registered trademark), or wireless communication. In addition, a communication protocol may be modbus/TCP or ECHONET Lite.

Example of Creation of Objective Function and Constraint Condition Expression A method for creating the objective function and the constraint condition expression for the optimization problem in the objective function and constraint condition creation unit 33 will be described. Before specific formulation is described, symbols are defined as illustrated in the following Tables 1 and 2. Table 1 shows time-related parameters in the optimization problem, which are given by the designer in most cases. Table 2 defines a set of times.

TABLE 1

| No. | Symbol | Unit | Description |
|---|---|---|---|
| 1 | H | Number of times | Number of steps to be optimized. It is assumed that the number of steps is 36 in the following example. |
| 2 | ΔT | Hour | Time width. It is assumed that the time width is 1 hour in the following example. |

TABLE 2

| Symbol | Description |
|---|---|
| K | Set of times (K = {0, 1, . . . , H − 1}) |
| $K_{SU}$ | Set of startup operation possible times ($K_{SU} \subseteq$ K), SU = Start Up<br>This is managed by startup and shutdown permission time period setting unit. |
| $K_{SD}$ | Set of shutdown operation possible times ($K_{SD} \subseteq$ K), SD = Shut Down<br>This is managed by startup and shutdown permission time period setting unit. |

Next, the parameters used to create the objective function and the constraint condition expression for the optimization problem will be described. Table 3 illustrates a list of parameters related to the water electrolysis device, and the parameters are stored in the water electrolysis setting DB 41. Table 4 illustrates a list of parameters related to the storage battery of the power storage facility, and the parameters are stored in the storage battery setting DB 42. Table 5 illustrates a list of other parameters, and some of the parameters are managed by the external system setting DB 43.

TABLE 3

| No. | Symbol | Type | Unit | Description |
|---|---|---|---|---|
| 1 | N | Constant | Number of devices | Number of water electrolysis devices. Two water electrolysis devices in. this example. |
| 2 | $p^{ECi}(k)$ | Dependent variable | kW | Power consumption of i-th water electrolysis device at time k ∈ K. |
| 3 | $Q^{ECi}(k)$ | Decision variable | $Nm^3/h$ | Hydrogen production flow rate of i-th water electrolysis device at time k ∈ K. |
| 4 | $z^{ECi}(k)$ | Decision variable | — | Binary variable (variable of 0 or 1) indicating operating state of i-th water electrolysis device at time k ∈ K. Binary variable is 1 in case in which device is being operated and is 0 in case in which device is stopped. |
| 5 | $z_0^{ECi}$ | Constant | — | Operating state of i-th water electrolysis device at initial time k = 0. EMS acquires this value from control unit of each water electrolysis device. |
| 6 | $\delta_{SU}^{ECi}(k)$ | Decision variable | — | Binary variable that is 1 in case in which i-th water electrolysis device starts up at time k ∈ K ($z^{ECi}(k)$ = 1 and $z^{ECi}(k-1)$ = 0) and is 0 in other cases. |

TABLE 3-continued

| No. | Symbol | Type | Unit | Description |
|---|---|---|---|---|
| | | | | It is hereinafter referred to as startup variable. Hereinafter, this is referred to as startup variable. |
| 7 | $\delta_{SD}^{ECi}(k)$ | Decision variable | — | Binary variable that is 1 in case in which i-th w ater electrolysis device is shut down at time k ∈ K ($z^{ECi}(k)$ = 0 and $z^{ECi}(k-1)$ = 1) and is 0 in other cases. Hereinafter, this is referred to as shutdown variable. |
| 8 | $Q_{max}^{ECi}$ | Constant | $Nm^3/h$ | Maximum hydrogen production flow rate of i-th water electrolysis device. This is managed by water electrolysis setting DB. |
| 9 | $Q_{min}^{ECi}$ | Constant | $Nm^3/h$ | Minimum hydrogen production flow rate of i-th water electrolysis device. This is managed by water electrolysis setting DB. |
| 10 | $p_{sb}^{ECi}$ | Constant | kW | Standby power of i-th water electrolysis device. This is power consumption, such as auxiliary power, and is power consumed regardless of hydrogen production flow rate. This is managed by water electrolysis setting DB. |
| 11 | $c^{ECi}$ | Constant | kWh/ $Nm^3$ | Power consumption rate of i-th water electrolysis device. This is managed by water electrolysis setting DB. |
| 12 | $p_{SU}^{ECi}$ | Constant | kW | Amount of power required to start up i-th water electrolysis device/ΔT. This is managed by water electrolysis setting DB. |
| 13 | $p_{SD}^{ECi}$ | Constant | kW | Amount of power required to shut down i-th water electrolysis device/ΔT. This is managed by water electrolysis setting DB. |
| 14 | $a^{ECi}(k)$ | Decision variable | kW | Auxiliary variable for suppressing amount of change in power consumption of i-th water electrolysis device at time k ∈ K. This is equal to or greater than 0. |
| 15 | $SU_{max}^{i}$ | Constant | Number of times | Upper limit of number of times i-th water electrolysis device starts up for planning period. This is managed by water electrolysis setting DB. |
| 16 | $SD_{max}^{i}$ | Constant | Number of times | Upper limit of number of times i-th water electrolysis device is shut down for planning period. This is managed by water electrolysis setting DB. |

Figure 3:
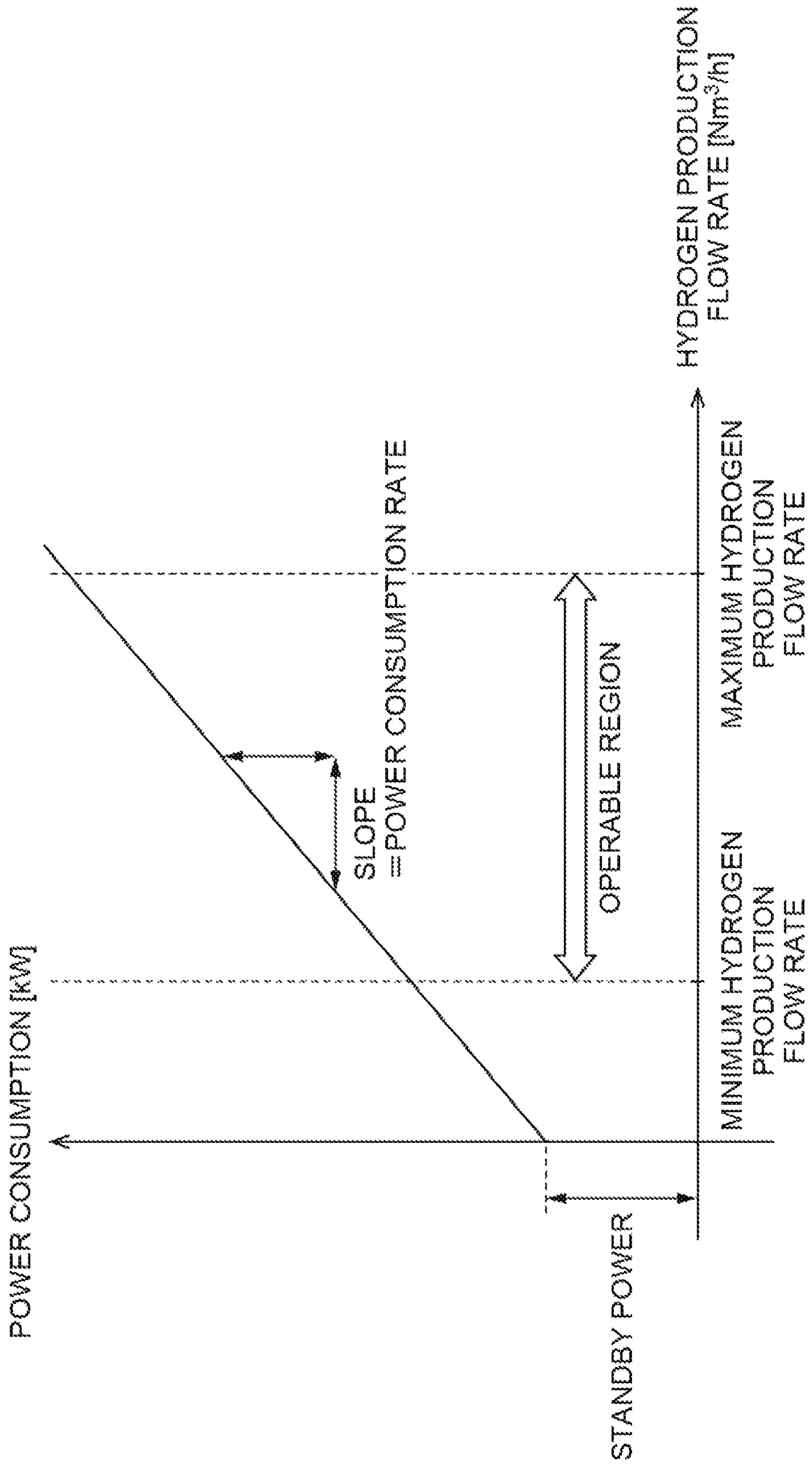
FIG. 3 is a diagram describing a relationship between a hydrogen production flow rate and power consumption in a water electrolysis device.

The maximum hydrogen production flow rate, the minimum hydrogen production flow rate, the standby power, and the power consumption rate of the water electrolysis device, which are the parameters related to Nos. 8 to 11 in Table 3, will be described with reference to FIG. 3. FIG. 3 is a diagram illustrating the relationship between the hydrogen production flow rate and the power consumption of the water electrolysis device. In the water electrolysis device, there is standby power that is basically consumed regardless of whether or not hydrogen is produced. In addition, in the water electrolysis device, power consumption occurs linearly according to the hydrogen production flow rate. The slope of the power consumption at this time is called the power consumption rate. Further, in the water electrolysis device, the minimum hydrogen production flow rate and the maximum hydrogen production flow rate during hydrogen production are determined. Therefore, when the operation plan for the water electrolysis device is created, it is necessary to set the hydrogen production flow rate between the minimum hydrogen production flow rate and the maximum hydrogen production flow rate during operation (during hydrogen production). The parameter group illustrated in Nos. 8 to 11 corresponds to the information related to the power consumption characteristics of the water electrolysis device.

In addition, the amount of power required to start up the water electrolysis device and the amount of power required to shut down the water electrolysis device, which are parameters related to Nos. 12 and 13 in Table 3, are power required only to start up or shut down the water electrolysis device and are factors that cause a temporary increase in power consumption. Therefore, in this embodiment, in some cases, the amounts of power are referred to as temporary power consumption.

TABLE 4

| No. | Symbol | Type | Unit | Description |
|---|---|---|---|---|
| 1 | $p^{ESS}(k)$ | Decision variable | kW | Charge and discharge power at time k ∈ K. Charge is positive and discharge is negative. |
| 2 | $q^{ESS}(k)$ | Dependent variable | kWh | Remaining storage battery level at time k ∈ K. |
| 3 | $q_0^{ESS}$ | Constant | kWh | Remaining storage battery level at initial time k = 0. EMS acquires this value from control unit of storage battery. |
| 4 | $q_{max}^{ESS}$ | Constant | kW | Maximum charge power. Positive value. This is managed by storage battery setting DB. |
| 5 | $p_{min}^{ESS}$ | Constant | kW | Maximum discharge power. Negative value. This is managed by storage battery setting DB. |
| 6 | $q_{max}^{ESS}$ | Constant | kWh | Maximum value of remaining storage battery capacity This is managed by storage battery setting DB. |
| 7 | $q_{min}^{ESS}$ | Constant | kWh | Minimum value of remaining storage battery capacity. This is managed by storage battery setting DB. |
| 8 | $Q^{ESS}$ | Constant | kWh | Storage battery capacity. This is managed by storage battery setting DB. |

TABLE 5

| No. | Symbol | Type | Unit | Description |
|---|---|---|---|---|
| 1 | $p^{PV}(k)$ | Constant | kW | Prediction value of photovoltaic power at time k ∈ K. This is created by PV power prediction unit. |
| 2 | $p^{sell}(k)$ | Decision variable | kW | Power transmitted to power system at time k ∈ K. |
| 3 | $p_{max}^{sell}$ | Constant | kW | Maximum value of transmission power. Non-negative value. This is determined by for example, contract with power transmission and distribution company. This is managed by external system setting DB. |
| 4 | $p_{min}^{sell}$ | Constant | kW | Minimum value of transmission power. Non-negative value. This is determined by, for example, contract with power transmission and distribution company. This is managed by external system setting DB. |

TABLE 5-continued

| No. | Symbol | Type | Unit | Description |
|---|---|---|---|---|
| 5 | $\beta(k)$ | Decision variable | kW | Auxiliary variable for suppressing fluctuation in transmission power at time k ∈. This is equal to or greater than 0. |

Table 6 illustrates a list of parameters used for the objective function. The parameters illustrated in Table 6 are managed by the weight DB 44.

TABLE 6

| No. | Symbol | Type | Unit | Description |
|---|---|---|---|---|
| 1 | $w^{H2}$ | Constant | yen/Nm$^3$ | Hydrogen unit price. This is managed by weight DB. |
| 2 | $w^{sell}$ | Constant | yen/kWh | Electricity sales unit price. This is managed by weight DB. |
| 3 | $w^{\alpha}$ | Constant | — | Adjustment parameter tor smoothing fluctuation in water electrolysis device as much as possible. This is managed by weight DB. |
| 4 | $w^{\beta}$ | Constant | — | Adjustment parameter for smoothing fluctuation in transmission power as much as possible. This is managed by weight DB. |

The objective function and constraint condition creation unit 33 creates a mixed integer programming problem as the optimization problem, using the above-described parameters. A mixed integer programming problem (P) will be described below. The mixed integer programming problem (P) is configured by the following Expressions (1) to (20).

[Equation 1]

$$\underset{Q^{ECi},z^{ECi},\delta_{SU}^{ECi},\delta_{SD}^{ECi},\alpha^{ECi},p^{ESS},p^{sell},\beta}{\text{maximize}} \left( w^{H2}\Delta T\sum_{i=1}^{N}\sum_{k\in K}Q^{ECi}(k)(P) + w^{sell}\Delta T\sum_{k\in K}p^{sell}(k) - \frac{w^{\alpha}}{\Delta T}\sum_{i=1}^{N}\sum_{k\in K}\alpha^{ECi}(k) - \frac{w^{\beta}}{\Delta T}\beta(k)\right) \tag{1}$$

*subj.to*

$$p^{PV}(k) = p^{sell}(k) + p^{ESS}(k) + \sum_{i=1}^{N}p^{ECi}(k),\ k\in K \tag{2}$$

$$p_{min}^{sell} \le p^{sell}(k) \le p_{max}^{sell},\ k\in K \tag{3}$$

$$p_{min}^{ESS} \le p^{ESS}(k) \le p_{max}^{ESS},\ k\in K \tag{4}$$

$$q_{min}^{ESS} \le q^{ESS}(k) \le q_{max}^{ESS},\ k\in K \tag{5}$$

$$q^{ESS}(k+1) = q^{ESS}(k) + \Delta T p^{ESS}(k),\ k\in K\backslash\{H-1\} \tag{6}$$

$$q^{ESS}(0) = q_0^{ESS} \tag{7}$$

$$z^{ECi}(k) \in \{0, 1\},\ k\in K,\ i = 1, \ldots, N \tag{8}$$

$$Q_{min}^{ECi}z^{ECi}(k) \le Q^{ECi}(k) \le Q_{max}^{ECi}z^{ECi}(k),\ k\in K,\ i = 1, \ldots, N \tag{9}$$

$$p^{ECi}(k) = c^{ECi}Q^{ECi}(k) + p_{sb}^{ECi}z^{ECi}(k) + p_{SU}^{ECi}\delta_{SU}^{ECi}(k) + p_{SD}^{ECi}\delta_{SD}^{ECi}(k),\ k\in K,\ i = 1\ldots, N \tag{10}$$

$$z^{ECi}(0) = z_0^{ECi}\ i = 1, \ldots, N \tag{11}$$

$$z^{ECi}(k) - z^{ECi}(k-1) = \delta_{SU}^{ECi}(k) - \delta_{SD}^{ECi}(k),\ k\in K\backslash\{0\},\ i = 1, \ldots, N \tag{12}$$

-continued $$\delta_{SU}^{ECi}(k) \in \{0, 1\}, k \in K, i = 1, \ldots, N \quad (13)$$

$$\delta_{SU}^{ECi}(k) = 0, k \notin K_{SU}, i = 1, \ldots, N \quad (14)$$

$$\delta_{SD}^{ECi}(k) \in \{0, 1\}, k \in K, i = 1, \ldots, N \quad (15)$$

$$\delta_{SD}^{ECi}(k) = 0, k \notin K_{SD}, i = 1, \ldots, N \quad (16)$$

$$\sum_{k \in K} \delta_{SU}^{ECi}(k) \leq SU_{max}^{i} \; i = 1, \ldots, N \quad (17)$$

$$\sum_{k \in K} \delta_{SD}^{ECi}(k) \leq SD_{max}^{i} \; i = 1, \ldots, N \quad (18)$$

$$-\alpha^{ECi}(k) \leq p^{ECi}(k) - p^{ECi}(k-1) \leq \alpha^{ECi}(k), k \in K \backslash \{0\}, i = 1, \ldots, N \quad (19)$$

$$-\beta(k) \leq p^{sell}(k) - p^{sell}(k-1) \leq \beta(\mathrm{km}), k \in K \backslash \{0\} \quad (20)$$

The meaning of each expression included in the mixed integer programming problem (P) is as follows. In addition, Expression (1) is an objective function, and Expressions (2) to (20) are constraint conditions.

Expression (1): is an objective function for maximization. The first term means a total hydrogen production price, the second term means an electricity sales price, the third term means a penalty term for fluctuations in water electrolysis, and the fourth term means a penalty term for fluctuations in transmission power.

Expression (2): A conditional expression related to that a power supply and demand balance is kept in the microgrid 2.

Expression (3): A conditional expression related to that transmission power is within a designated range.

Expression (4): A conditional expression related to that the charge and discharge power of the storage battery is within a designated range.

Expression (5): A conditional expression related to that the remaining storage battery level is within a designated range.

Expression (6): A conditional expression that defines the remaining storage battery level.

Expression (7): A conditional expression that defines the initial remaining storage battery level.

Expression (8): A conditional expression indicating that the water electrolysis device is in an operating state or a stop state.

Expression (9): A conditional expression indicating that the hydrogen production flow rate is within a designated range in a case in which the water electrolysis device is being operated and has a value of 0 in a case in which the water electrolysis device is stopped.

Expression (10): An expression for calculating the power consumption of the water electrolysis device. In a case in which the device is in the stop state ($Z^{ECi}$(k)=0), the power consumption is basically zero. However, power consumption required for the shutdown operation is $p^{ECi}{}_{SD}$ only during shutdown. The power consumption required for the shutdown operation is, for example, the power required to operate fans and pumps for replacing harmful substances in the device and pipes after the device is stopped. In a case in which the device is being operated ($Z^{ECi}$(k)=1), the power consumption is determined according to a hydrogen production flow rate $Q^{ECi}$(k) and standby power $p^{ECi}{}_{Sb}$. Furthermore, during startup, the power consumption $p^{ECi}{}_{SU}$ corresponding to the startup operation is further added. The power consumption corresponding to the startup operation is, for example, the power consumption of an electric heater used for a preheating operation before the device is started.

Expression (11): A conditional expression that defines the operating state of the water electrolysis device at the initial time.

Expression (12): A relational expression between the operating state of the water electrolysis device and the startup and shutdown operations.

Expression (13): A conditional expression indicating that a startup variable of the water electrolysis device has only a value of 0 or 1.

Expression (14): A conditional expression indicating that the water electrolysis device can be started only during the permitted time period.

Expression (15): A conditional expression indicating that the startup variable of the water electrolysis device has only a value of 0 or 1.

Expression (16): A conditional expression indicating that the water electrolysis device can be shut down only during the permitted time period.

Expression (17): A conditional expression indicating that the number of times the water electrolysis device is started up is equal to or less than a designated number of times.

Expression (18): A conditional expression indicating that the number of times the water electrolysis device is shut down equal to or less than a designated number of times.

Expression (19): A constraint expression for an auxiliary variable $\alpha^{ECi}$(k) introduced to suppress a change in the power consumption of the water electrolysis device.

Expression (20): A constraint expression for an auxiliary variable β(k) introduced to suppress a change in power transmitted to a system.

The auxiliary variables included in the above-described optimization problem are supplemented. As described above, the auxiliary variable $\alpha^{ECi}$ is introduced in order to suppress an increase in the power consumption of the water electrolysis device in a short time. In addition, the auxiliary variable β is introduced in order to avoid a sudden change in transmission power.

In a case in which the photovoltaic power generated in the microgrid 2 is not capable being consumed by the water electrolysis devices 22A and 22B and the power storage facility 23, the photovoltaic power is transmitted to the external power system 90. However, the transmission of power to the power system 90 with large fluctuations threatens the stability of the power system 90, which is not preferable. Therefore, even in a case in which power is transmitted to the power system 90, the effect of transmitting power as gently as possible in terms of time is obtained by the use of the above-described auxiliary variables. In addition, the inventors have confirmed that another effect of preventing wasteful discharge of the storage battery of the power storage facility 23 is obtained in the vicinity of the end of the operation plan obtained by solving the optimization problem in a case in which these auxiliary variables are used.

An example of a simulation for creating the operation plan will be described below. However, the following has been confirmed: in a case in which these auxiliary variables are not used and both the water electrolysis devices perform a rated operation in the vicinity of the end of the operation plan, there is no difference in the maximum value of the objective function when the power storage facility 23 is stopped or discharged; and, therefore, the phenomenon that the power storage facility 23 is discharged and transmits power has occurred in rare cases. In contrast, it has been confirmed that the above-described effect of preventing unnecessary discharge is obtained by the configuration in which the above-described auxiliary variables are input to create the optimization problem and the optimization problem is solved.

In the EMS 3, the operation plan is created in the following procedure. As advance preparation, necessary information (for example, set values and parameters) are prepared in the startup and shutdown permission time period setting unit 31, the water electrolysis setting DB 41, the storage battery setting DB 42, the external system setting DB 43, and the weight DB 44. In this state, in the EMS 3, the PV power prediction unit 32, the objective function and constraint condition creation unit 33, and the optimization unit 34 are operated to create the operation plan. That is, the operation plan is created on the basis of the information related to the prediction value of the power generated in the photovoltaic power generation facility 21 for the entire plan creation period, the information related to the power consumption characteristics of the water electrolysis devices 22A and 22B, and the information related to the temporary power consumption necessary for the start operation or the stop operation of the water electrolysis devices 22A and 22B included in the operation plan.

A trigger condition for starting the creation of the operation plan by the EMS 3, that is, for starting calculations related to optimization may be the pressing of a button by the operator. In addition, the creation may be performed at a predetermined time or may be repeatedly performed with a fixed time period (for example, with a period of 1 hour).

EXAMPLES

Next, the simulation results of creating the operation plan with the EMS 3 in the power supply system 1 will be described.

First, as preconditions for creating the operation plan in the microgrid 2, a parameter group other than photovoltaic power was set under the following conditions.

(1) An optimization section was set to one and a half days (36 hours). In many cases, the operation plan for the microgrid 2 is created on a daily basis. However, in this example, the calculation time required for optimization is long, but it is assumed that it is better to perform optimization in a section including nighttime when photovoltaic power is zero since the constraint is that startup and shutdown are not performed at night, which will be described below. Assuming that one day (24 hours) is set, the end of the operation plan will be 23:00 according to the assumption of this example. In a case in which there is no remaining battery level of the storage battery of the power storage facility 23 at the end of the plan, the water electrolysis device 22A and 22B need to be stopped. This is because the situation deviates from constraints on the startup and shutdown permission time period intended in this optimization.

(2) It was set that the water electrolysis devices 22A and 22B could be started up from 7:00 a.m. to 2:00 p.m. and could be shut down from 8:00 a.m. to 5:00 p.m. In other words, it was set that the startup or shutdown operations in the nighttime were not permitted.

(3) It was set that only the transmission of power to the power system 90 was assumed and power reception was not performed.

(4) In the microgrid 2, hydrogen production had priority over electricity sales, a weight for the hydrogen production was set to 1, and a weight for the electricity sales was set to 0. In addition, optimization calculation was repeated several times to adjust and determine weights $w^{\alpha}$ and $w^{\beta}$. The values of the third and fourth terms of the objective function are set to be sufficiently smaller than the value of the first term.

Parameters set on the basis of the above settings are illustrated in the following Table 7.

TABLE 7

| |
|---|
| $H = 36$ |
| $\Delta T = 1$ |
| $K_{SU} = \{7, 8, 9, 10, 11, 12, 13, 14, 31, 32, 33, 34, 35\}$ |
| $K_{SD} = \{8, 9, 10, 11, 12, 13, 14, 15, 16, 17, 32, 33, 34, 35\}$ |
| $N = 2$ |
| $z_0^{ECi} = 0, i = 1, 2$ |
| $Q_{max}^{ECi} = 50, i = 1, 2$ |
| $Q_{min}^{ECi} = 5, i = 1, 2$ |
| $p_{sb}^{ECi} = 10, i = 1, 2$ |
| $c^{ECi} = 6, i = 1, 2$ |
| $p_{SU}^{ECi} = 20, i = 1, 2$ |
| $p_{SD}^{EDi} = 20, i = 1, 2$ |
| $SU_{max}^{i} = 2, i = 1, 2$ |
| $SD_{max}^{i} = 2, i = 1, 2$ |
| $q_0^{ESS} = 10$ |
| $q_{max}^{ESS} = 500$ |
| $p_{min}^{ESS} = -500$ |
| $q_{max}^{ESS} = 1990$ |
| $q_{min}^{ESS} = 10$ |
| $Q^{ESS} = 2000$ |
| $p_{max}^{sell} = 1000$ |
| $p_{min}^{sell} = 0$ |
| $w^{H2} = 1$ |
| $w^{sell} = 0$ |
| $w^{\alpha} = 1 \times 10^{-5}$ |
| $w^{\beta} = 1 \times 10^{-10}$ |

Figure 4:
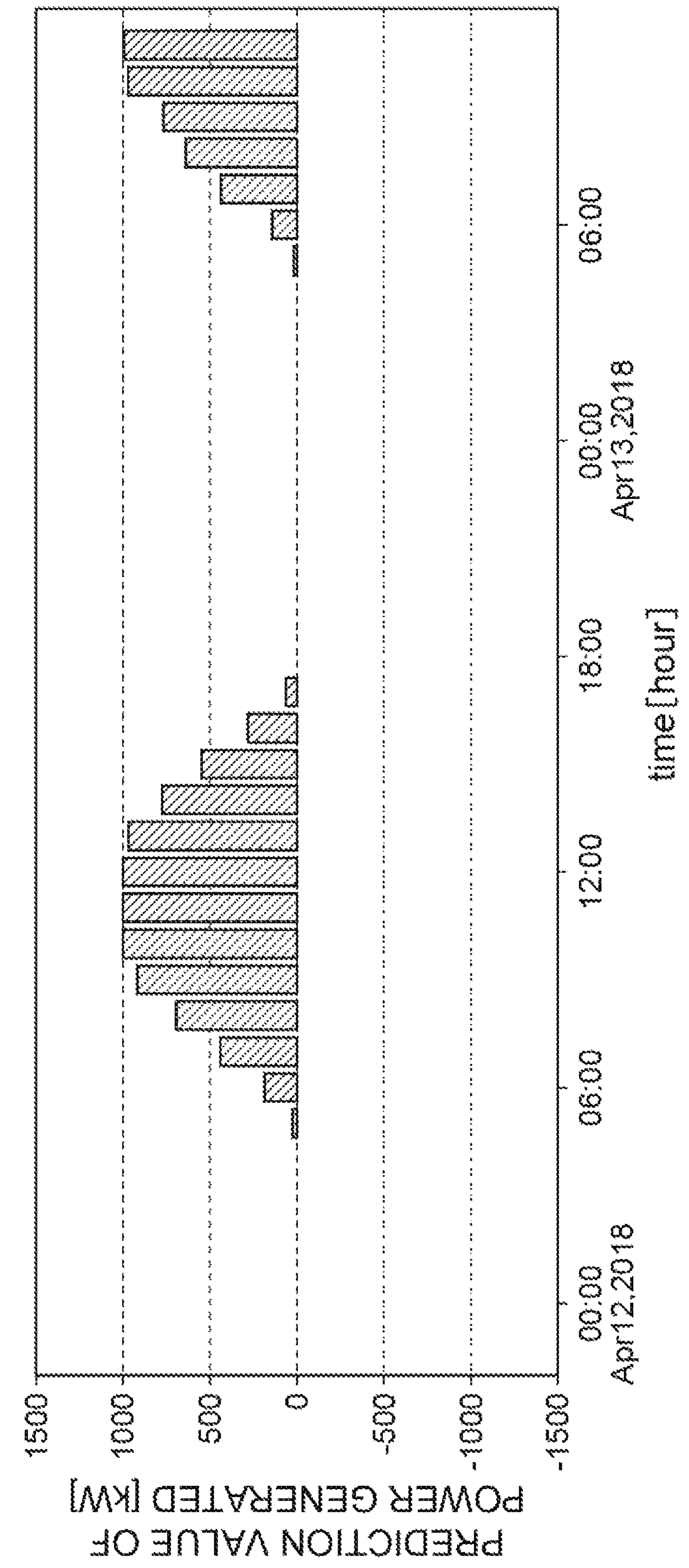
FIG. 4 is a diagram illustrating a prediction value of power generated by photovoltaic power generation in a first example.
Figure 6:
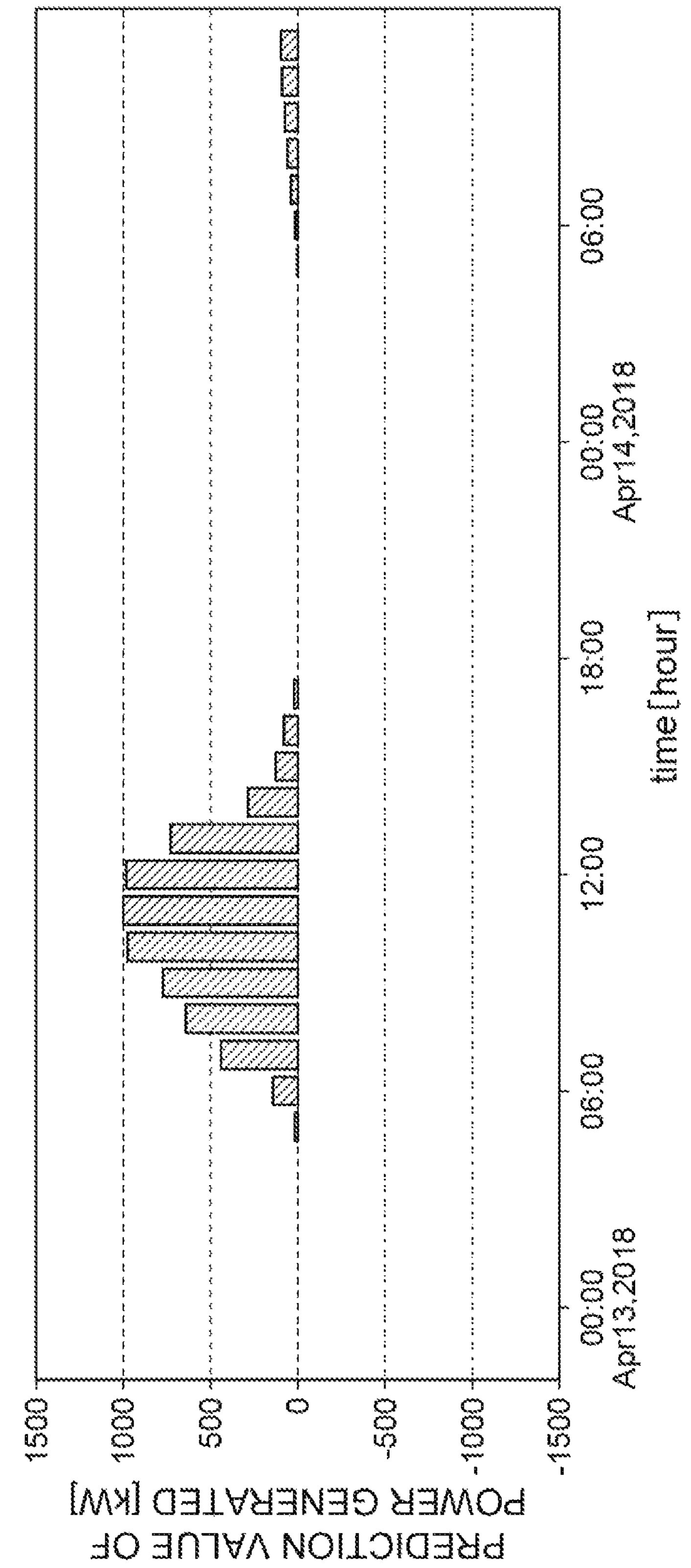
FIG. 6 is a diagram illustrating a prediction value of power generated by photovoltaic power generation in a second example.

Parameters having fixed values as described above were set, and a one-and-a-half-day operation in which a plan starting time was 00:00 on Apr. 12, 2018 and a target period was from 00:00 on April 12 to 12:00 on Apr. 13, 2018 was created. As a first example, the results in a case in which a prediction value of photovoltaic power is as illustrated in FIG. 4 are illustrated in FIG. 5. As a second example, the results in a case in which a prediction value of photovoltaic power is as illustrated in FIG. 6 are illustrated in FIG. 7.

First Example

In the first example, as illustrated in FIG. 4, for an operation plan target period, a simulation was performed in a case in which sunlight irradiation was generally sufficient for a time period assumed to be the time from sunrise to sunset.

In the simulation results illustrated in FIG. 5, a power balance in the microgrid is represented by a stacked bar graph based on the left axis, and a state of charge (SoC) of the storage battery is represented by a line graph based on the right axis. SoC can be calculated as $100 \times q^{ESS}(k)/Q^{ESS}$.

In the stacked bar graph illustrated in FIG. 5, a side above the origin indicates a power load (the power consumption of the water electrolysis device, the charge power of the storage battery, and transmission power), and a side below the origin indicates power supply (photovoltaic power and the discharge power of the storage battery). The premise for creating the operation plan is that power is balanced in the system. Therefore, the stacked bar graph is vertically symmetrical (a constraint expression of the above-described Expression (2)).

The results illustrated in FIG. 5 show that the storage battery is charged with photovoltaic power until 6:00 on the first day (April 12) and both the water electrolysis devices 1 and 2 perform the rated operation from 7:00 to 15:00. The following results were obtained: the water electrolysis device 1 was stopped from 16:00 when photovoltaic power was reduced; and only the water electrolysis device 2 continued to operate until the next day (April 13) using the power of the storage battery.

Second Example

In a second example, as illustrated in FIG. 6, a simulation was performed on condition that sunlight irradiation was reduced for the operation plan target period. Specifically, the simulation was performed using the prediction value at which photovoltaic power generation would be reduced sharply after the afternoon of the first day (for example, it would be cloudy or rainy).

In this case, as shown in the results illustrated in FIG. 7, the storage battery is charged with photovoltaic power until 6:00 on the first day (April 12) and both the water electrolysis devices are operated from 7:00. At 14:00, the photovoltaic power is reduced sharply, but the storage battery is discharged to continuously operate the two water electrolysis devices in the vicinity of the rated power where hydrogen production efficiency is high. As described above, in the case of the second example, unlike the first example, the results showing that, when the power of the storage battery was used for a long operation time in the vicinity of the rated power, the amount of hydrogen produced was larger than that in the night operation were obtained.

In addition, both the first example and the second example show that the startup time and the shutdown time of the water electrolysis device comply with their constraint conditions (the above-described Condition (2)).

Further, after the optimization solution is obtained, as described above, the EMS 3 may create the visualization graph illustrated in FIG. 5 or 7 and present the visualization graph to the operator through a display of a personal computer or a smart phone. Furthermore, at least a portion of the information included in the operation plan obtained using other methods may be notified to the operator.

[Hardware Configuration]

Figure 8:
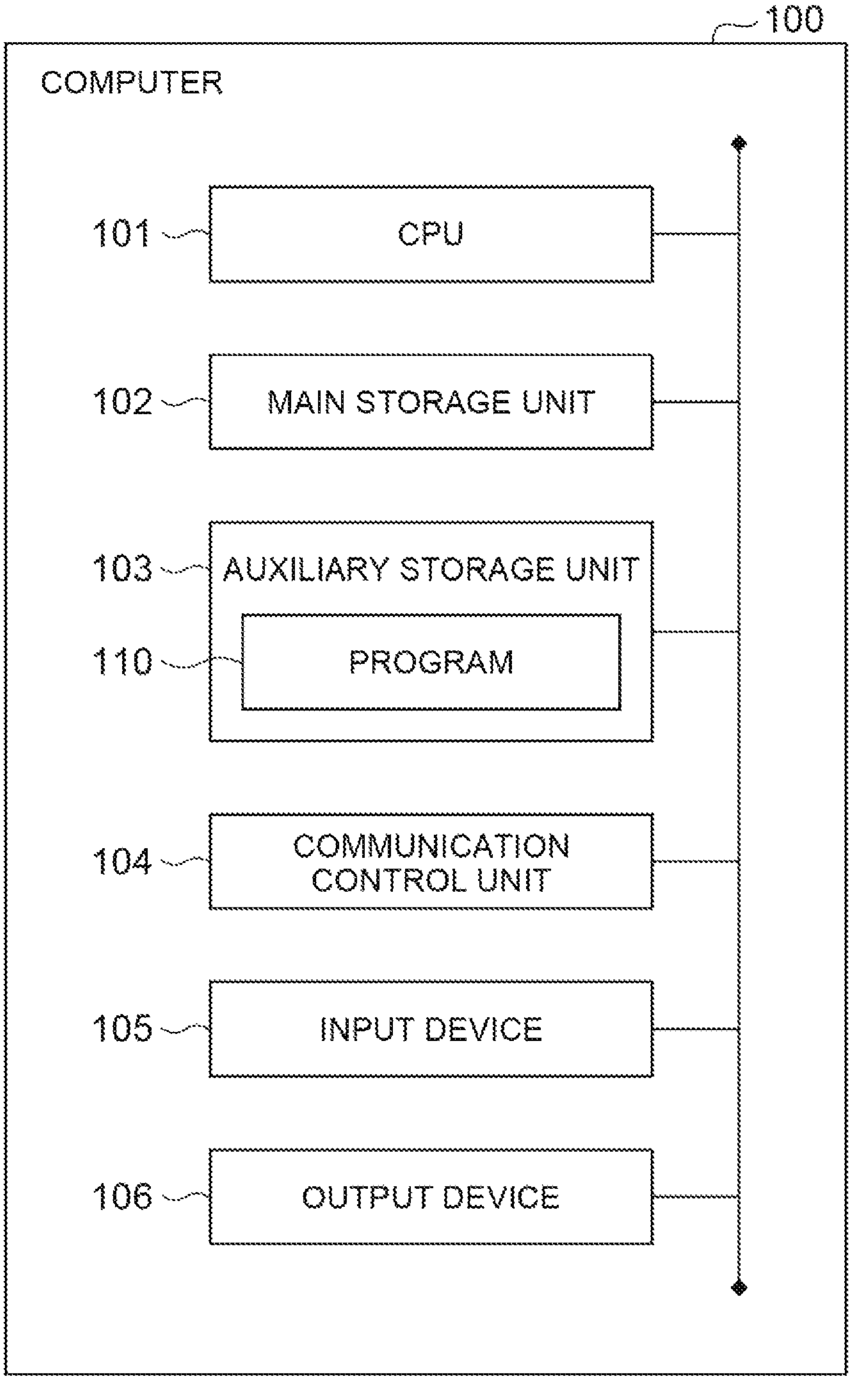
FIG. 8 is a diagram illustrating an example of a hardware configuration of the EMS.

A hardware configuration of the EMS 3 will be described with reference to FIG. 8. FIG. 8 is a diagram illustrating an example of the hardware configuration of the EMS 3. As illustrated in FIG. 8, the EMS 3 includes one or more computers 100. The computer 100 has a central processing unit (CPU) 101, a main storage unit 102, an auxiliary storage unit 103, a communication control unit 104, an input device 105, and an output device 106. The EMS 3 is configured by one or more computers 100 configured by these hardware components and software such as programs.

In a case in which the EMS 3 is configured by a plurality of computers 100, these computers 100 may be connected locally or through a communication network such as the Internet or an intranet. One EMS 3 is logically constructed by this connection.

The CPU 101 executes, for example, an operating system and application programs. The main storage unit 102 is configured by a read only memory (ROM) and a random access memory (RAM). The auxiliary storage unit 103 is a storage medium that is configured by, for example, a hard disk and a flash memory. The auxiliary storage unit 103 generally stores a larger amount of data than the main storage unit 102. The communication control unit 104 is configured by a network card or a wireless communication module. At least some of the communication functions of the EMS 3 with other devices may be implemented by the communication control unit 104. The input device 105 is configured by, for example, a keyboard, a mouse, a touch panel, and a voice input microphone. The output device 106 is configured by, for example, a display and a printer.

The auxiliary storage unit 103 stores a program 110 and data necessary for processes in advance. The program 110 causes the computer 100 to implement each functional element of the EMS 3. The program 110 causes the computer 100 to perform, for example, the processes related to the above-described operation plan creation method. For example, the program 110 is read by the CPU 101 or the main storage unit 102 and operates at least one of the CPU 101, the main storage unit 102, the auxiliary storage unit 103, the communication control unit 104, the input device 105, and the output device 106. For example, the program 110 reads and writes data from and to the main storage unit 102 and the auxiliary storage unit 103.

The program 110 may be recorded on a tangible storage medium, such as a CD-ROM, a DVD-ROM, or a semiconductor memory, and then provided. The program 110 may be provided as data signals through a communications network.

Operation and Effect of Embodiment

In the EMS 3 as an operation plan creation device, the operation plan creation method, and the operation plan creation program, in the microgrid 2 including the photovoltaic power generation facility 21 as a renewable energy generation device and the water electrolysis devices 22A and 22B as load devices, the operation plan for the water electrolysis devices 22A and 228 is created. The operation plan includes a plan for performing the start operation (startup operation) or the stop operation (shutdown operation) of the water electrolysis devices 22A and 22B. Then, the EMS 3 creates the operation plan on the basis of the information related to the prediction value of the power generated in the photovoltaic power generation facility 21 for the entire operation plan creation period, the information related to the power consumption characteristics of the water electrolysis devices 22A and 22B, and the information related to the temporary power consumption necessary for the start operation or the stop operation of the water electrolysis devices 22A and 22B included in the operation plan.

As described above, in the method according to this embodiment, the operation plan is created on the basis of the information related to the prediction value of the power generated in the photovoltaic power generation facility 21 for the entire operation plan creation period, the information related to the power consumption characteristics of the water electrolysis devices 22A and 22B, and the information related to the temporary power consumption necessary for the start operation or the stop operation of the water electrolysis devices 22A and 22B. The use of the information related to the power consumption characteristics of the water electrolysis devices 22A and 22B and the information related to the temporary power consumption necessary for the start operation or the stop operation of the water electrolysis devices 22A and 22B makes it possible to create the operation plan on the basis of more detailed information related to the power consumption of the water electrolysis devices 22A and 22B including temporary power consumption. Therefore, it is possible to flexibly create the operation plan considering the power consumption characteristics of the water electrolysis devices 22A and 22B which are load devices.

In particular, since the operation plan created by the above-described method is an operation plan created considering the power required for the startup and shutdown operations of the water electrolysis devices 22A and 22B, it is necessary to create an operation plan that is highly feasible.

The microgrid 2 may have the power storage facility 23 as an energy storage device. In this case, the EMS 3 may create the operation plan on the basis of the amount of electricity stored (the amount of energy stored) in the power storage facility 23. This configuration makes it possible to create the operation plan assuming that power is stored in the power storage facility 23 and that the stored power is utilized and thus to more flexibly create the operation plan.

The EMS 3 may create the operation plan on condition that the time period for which the start operation or the stop operation can be performed is limited. In some cases, the time period for which the start operation and the stop operation of the water electrolysis devices 22A and 22B can be performed is limited. For example, the operations need to be performed by the operator. The above-described configuration makes it possible to create the operation plan considering, for example, a personnel distribution and thus to create the operation plan having reduced obstacles to execution. In addition, it is possible to plan a personnel distribution on the basis of the operation plan.

The EMS 3 may create the operation plan on condition that the upper limits of the start operation and the stop operation of the water electrolysis devices 22A and 22B and the number of start operations and stop operations are designated. It is considered that an increase in the number of start operations and stop operations of the water electrolysis devices 22A and 22B is likely to lead an increase in the burden on the operator and to cause deterioration resulting from fluctuations in power consumption caused by the start operation and the stop operation of the load devices. In this case, the above-described configuration makes it possible to create the operation plan having reduced obstacles to execution.

The EMS 3 may create the operation plan on condition that priority is given to a plan in which fluctuations in the power consumption of the water electrolysis devices 22A and 22B are gentle. In the above-described embodiment, the adjustment parameter $w^{\alpha}$ for smoothing the fluctuations in the power consumption of the water electrolysis devices 22A and 22B as much as possible and the auxiliary variable $\alpha^{ECi}$ are used to achieve the condition that priority is given to the plan in which fluctuations in power consumption are gentle. The fluctuations in the power consumption of the water electrolysis devices 22A and 22B are likely to affect deterioration of the devices. In addition, the amount of energy exchanged with the outside is likely to change due to the fluctuations in the power consumption of the water electrolysis devices 22A and 22B. In contrast, the above-described configuration makes it possible to create the operation plan having reduced obstacles to execution.

The microgrid 2 may exchange energy with the external power system 90. In this case, the EMS 3 may create the operation plan on condition that priority is given to the plan in which fluctuations in the amount of energy exchanged with the outside are gentle. In the above-described embodiment, the adjustment parameter $w^{\beta}$ for smoothing fluctuations in transmission power as much as possible and the auxiliary variable $\beta$ are used to achieve the condition that the plan in which fluctuations in the power exchanged with the external power system 90 are gentle is preferentially adopted. When the amount of energy exchanged with the outside increases, the increase is likely to threaten the stability of the external power system. In contrast, the above-described configuration makes it possible to create the operation plan in which the amount of energy exchanged with the outside is stable.

More specifically, the EMS 3 may set an optimization problem on the condition that the total amount of products produced by the operation of the water electrolysis devices 22A and 22B or a profit based on the products is maximized and solve the optimization problem to create the operation plan. The above-described configuration makes it is possible to create the operation plan on condition that the result based on the operation of the load devices is large.

In addition, according to the configuration in which the optimization problem is set and solved, it is possible to make a decision on a complex problem of whether it is better to operate the water electrolysis devices 22A and 22B at night with the power stored in the power storage facility 23 or whether it is better to stop the water electrolysis devices 22A and 22B, in order to maximize the amount of hydrogen produced or profits on the basis of the prediction value of the power generated by photovoltaic power generation.

Further, as in the above-described embodiment, in a case in which renewable energy is photovoltaic power and there is a constraint that the start operation or the stop operation of the water electrolysis devices 22A and 22B is not performed for a period (that is, at night) from the end of power generation to the start of power generation in the photovoltaic power generation facility 21, the end of the section, for which the operation plan is to be created using the optimization problem, can be set from the end of power generation to the start of power generation in the photovoltaic power generation facility 21.

In a case in which the end of the section, for which the optimization problem is to be set (for which the operation plan is to be created), is night, the plan can be created such that the water electrolysis devices 22A and 22B are operated with the power stored in the power storage facility 23 until the end timing of the operation plan. However, after the target section of the operation plan ends, the operation plan is not guaranteed. That is, the following situation is also considered: in a case in which the storage capacity of the power storage facility 23 is 0, the water electrolysis devices 22A and 22B have to be stopped since the photovoltaic power generation facility 21 is also not operating. Since only the operation plan within the planned section is created, the above-mentioned optimization problem is set not to be considered after the planned section ends. Therefore, under the condition that the water electrolysis devices 22A and 22B are not capable of being stopped at night, it is inappropriate for the end of the planned section to be night. In other words, the end of the planned section can be set to a time period for which the load devices (the water electrolysis devices 22A and 22B) can be stopped. This configuration makes it possible to prevent an abnormal operation of each unit constituting the microgrid 2 (particularly, forced shutdown of the water electrolysis devices) after the end timing of the planned section.

Modification Examples

The present disclosure is not necessarily limited to the above-described embodiment, and various modifications can be made without departing from the scope of the present disclosure.

In the above-described embodiment, the case in which the microgrid 2 has two water electrolysis devices 22A and 22B has been described. In the above-described example, two water electrolysis devices are provided. However, the number of water electrolysis devices may be one or three or more. One water electrolysis device and one electric boiler may be combined.

In the above-described embodiment, for the sake of simplicity, energy loss caused by the charge and discharge of the storage battery in the power storage facility 23 is not considered. Actually, it is not possible to take out all of the charged electric energy by discharging. The loss caused by charging and discharging may be considered. For example, the method disclosed in Japanese Unexamined Patent Publication No. 2019-97267 (an energy management system, a power supply and demand plan optimization method, and a power supply and demand plan optimization program) may be used as a method for formulating optimization considering charge and discharge loss.

In the above-described embodiment, it is assumed that one power storage facility 23 (storage battery) is provided. However, a plurality of power storage facilities may be provided. Those skilled in the art can easily expand the objective function and the constraint conditions according to a change in the number of power storage facilities 23. In addition, even in the microgrid 2 without the power storage facility 23, it is possible to create an operation plan similar to that in the above-described embodiment. In this case, the relevant portions of the objective function and the constraint conditions can be changed to respond to the above-mentioned extensions and changes.

In the above-described embodiment, it is assumed that the microgrid 2 exchanges energy with the external power system 90. However, the above-described method can also be applied to the microgrid 2 that does not exchange energy with the outside. For example, even in an off-grid-type microgrid 2, it is possible to create an operation plan similar to that in the above-described embodiment. In this case, the relevant portions of the objective function and the constraint conditions can be changed to respond to the above-mentioned extensions and changes.

In the above-described embodiment, $SU^i_{max}$, which is the upper limit of the number of startup operations, is set to 2. However, this is one of setting examples. For example, the upper limit of the number of startup operations may be automatically adjusted by the program. A process of changing settings on the basis of the operating state of the water electrolysis device may be performed. For example, in a case in which $z^{ECi}_0$, which is the initial state of the water electrolysis device, is 1 (that is, the device has already been started up at the start of the plan), $SU^i_{max}$ is set to 1.

In the above-described embodiment, the upper limit of the number of startup operations and the lower limit of the number of shutdown operations are designated for the entire section. However, these values may be designated more finely for each time period. For example, it is considered that the upper limit of the number of startup operations on the first day and the upper limit of the number of startup operations on the second day are individually set. This holds for the lower limit of the number of shutdown operations. In the case of the operation in which the operator starts up and shuts down the water electrolysis device in the microgrid, consideration can be given to constraints on, for example, the total amount of work or manpower by creating the operation plan using the above-mentioned constraint conditions.

In addition, in a case in which there are specific constraints on the operation of the water electrolysis device, conditions based on the constraints may be set. For example, in a case in which an operation rule that the water electrolysis device is started up and shut down every day is determined on the basis of the policy that the water electrolysis device is not operated at night, the number of shutdown operations may be designated, instead of setting the upper limit of the number of startup operations. In this case, it is possible to respond to the above configuration by replacing the inequality sign in Expression (17) among the above-described constraint conditions with an equal sign. This holds for the shutdown operation.

The constraint conditions on the number of startup operations and the number of shutdown operations may be set for each water electrolysis device, and the number of startup operations and the number of shutdown operations for all of the devices (for example, two devices) may be added as the constraint conditions.

In the above-described embodiment, the description has been made on the premise that the relational expression (see FIG. 3) between the hydrogen production flow rate and power consumption is a linear expression. However, a higher-order relational expression or a nonlinear map may be used. The constraint conditions can be changed on the basis of information related to the relationship between the hydrogen production flow rate and power consumption to respond to the optimization problem.

In the above-described embodiment, the optimization problem is formulated as the mixed integer linear programming problem. However, the present disclosure is not particularly limited thereto. For example, the optimization problem may be formulated as a nonlinear programming problem. For example, a genetic algorithm (GA) or particle swarm optimization (PSO) may be used as an algorithm for solving the nonlinear programming problem. In addition, since it is known that it is difficult to calculate a global optimum solution for the nonlinear programming problem, a quasi-optimal solution (approximate solution) may be calculated.

APPENDIX

Hydrogen is attracting attention as a next-generation energy source. In the present disclosure, it is possible to efficiently produce hydrogen using 100% of power derived from renewable energy. Therefore, the present disclosure contributes to the following goals and targets of the Sustainable Development Goals (SDGs) led by the United Nations:

Goal 7 “Ensure access to affordable, reliable, sustainable, and modern energy for all”;

Target 7.2 “By 2030, increase substantially the share of renewable energy in the global energy mix”;

Goal 9 “Build resilient infrastructure, promote inclusive and sustainable industrialization, and foster innovation”

Target 9.4 “By 2030, upgrade infrastructure and retrofit industries to make them sustainable, with increased resource-use efficiency and greater adoption of clean and environmentally sound technologies and industrial processes, with all countries taking action in accordance with their respective capabilities”.

REFERENCE SIGNS LIST

1: Power supply system, 2: Microgrid, 3: Energy management system (EMS: operation plan creation device), 21: Photovoltaic power generation facility (renewable energy generation device), 21*a*: Photovoltaic panel, 22A: Water electrolysis device (load device), 22B: Water electrolysis device (load device), 23: Power storage facility (energy storage device), 24: Connection unit, 25: Received power measurement unit, 26: Transmission power measurement unit, 31: Startup and shutdown permission time period setting unit, 32: PV power prediction unit (creation unit), 33: Constraint condition creation unit (creation unit), 34: Optimization unit (creation unit), 90: Power system.

What is claimed is:

1. An operation plan creation device that creates an operation plan for a load device in a microgrid including a renewable energy generation device and the load device, the operation plan including a plan for performing a start operation or a stop operation of the load device, the operation plan creation device comprising:

at least one processor configured to:

execute a program to set an optimization problem that models a physical constraint of the microgrid, create the operation plan by solving the optimization problem, and create the operation plan on the basis of information related to a prediction value of power generated in the renewable energy generation device for an entire creation period of the operation plan, information related to power consumption characteristics of the load device, and information related to power consumption necessary only for the start operation or the stop operation of the load device included in the operation plan.

2. The operation plan creation device according to claim 1, wherein the microgrid further includes an energy storage device, and the at least one processor is further configured to create the operation plan also on the basis of an amount of energy stored in the energy storage device.

3. The operation plan creation device according to claim 1, wherein the at least one processor is further configured to create the operation plan on condition that a time period for which the start operation or the stop operation is executable is limited.

4. The operation plan creation device according to claim 1, wherein the at least one processor is further configured to create the operation plan on condition that upper limits of the start operation and the stop operation of the load device or the numbers of start operations and stop operations are designated.

5. The operation plan creation device according to claim 1, wherein the at least one processor is further configured to create the operation plan on condition that a plan with smoother fluctuations in power consumption of the load device is prioritized.

6. The operation plan creation device according to claim 1, wherein the microgrid is capable of exchanging energy with an outside, and the at least one processor is further configured to create the operation plan on condition that a plan with smoother fluctuations in an amount of energy exchanged with the outside is prioritized.

7. The operation plan creation device according to claim 1, wherein the at least one processor is further configured to set an optimization problem on condition that a total amount of product generated by an operation of the load device or a profit based on the product is maximized and solve the optimization problem to create the operation plan.

8. An operation plan creation method that creates an operation plan for a load device in a microgrid including a renewable energy generation device and the load device, by a computer comprising at least one processor, the operation plan including a plan for performing a start operation or a stop operation of the load device, the operation plan creation method comprising:

creating the operation plan on the basis of information related to a prediction value of power generated in the renewable energy generation device for an entire creation period of the operation plan, information related to power consumption characteristics of the load device, and information related to power consumption necessary only for the start operation or the stop operation of the load device included in the operation plan.

9. A non-transitory computer-readable storage medium on which is recorded an operation plan creation program that causes a computer to create an operation plan for a load device in a microgrid including a renewable energy generation device and the load device, the operation plan including a plan for performing a start operation or a stop operation of the load device, the non-transitory computer-readable storage medium on which is recorded the operation plan creation program causing at least one processor included in the computer to execute:

creating the operation plan on the basis of information related to a prediction value of power generated in the renewable energy generation device for an entire creation period of the operation plan, information related to power consumption characteristics of the load device, and information related to power consumption necessary only for the start operation or the stop operation of the load device included in the operation plan.

* * * * *